United States Patent [19]
Morrow

[11] Patent Number: 5,351,500
[45] Date of Patent: Oct. 4, 1994

[54] REFRIGERANT LEAK DETECTOR SYSTEM

[75] Inventor: Gordon R. Morrow, South Houston, Tex.

[73] Assignee: Texas Medical Center Central Heating and Cooling Cooperative Association, Houston, Tex.

[21] Appl. No.: 161,959

[22] Filed: Dec. 3, 1993

[51] Int. Cl.⁵ .................... F25F 49/02; F28F 11/00
[52] U.S. Cl. ............................. 62/129; 62/127; 165/70
[58] Field of Search ................ 62/125, 126, 127, 129, 62/85, 195, 475; 165/70, 11.1

[56] References Cited

U.S. PATENT DOCUMENTS 4,138,856  2/1979  Orlowski ..................... 62/127 X
4,316,364  2/1982  Spaushus ..................... 62/129

Primary Examiner—Harry B. Tanner
Attorney, Agent, or Firm—Fulbright & Jaworski

[57] ABSTRACT

A refrigerant leak detection apparatus and method for testing for leaking refrigerant within a heat exchanging fluid, particularly for testing for leaking refrigerant in a chiller system comprising heat exchangers.

8 Claims, 2 Drawing Sheets

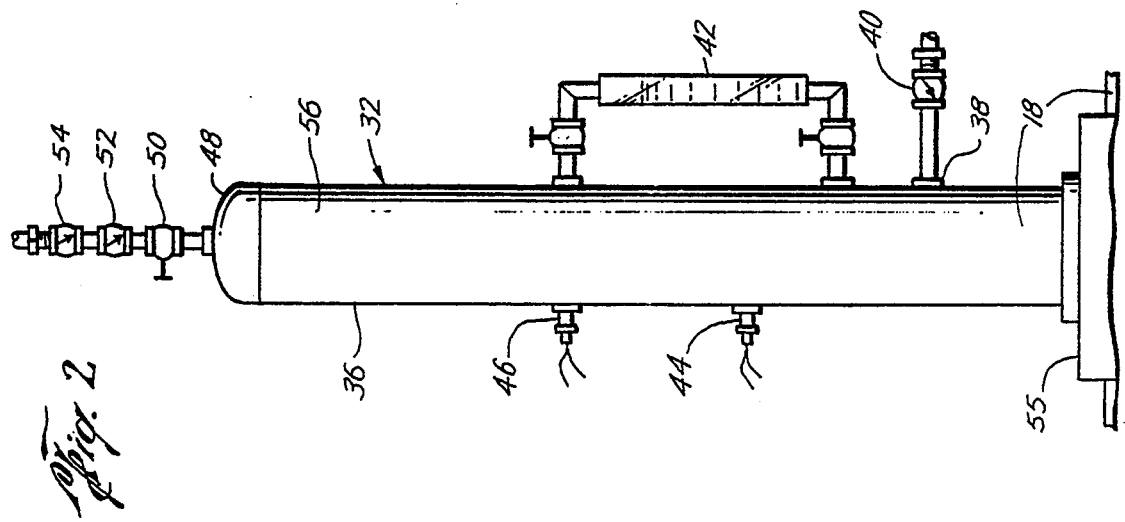
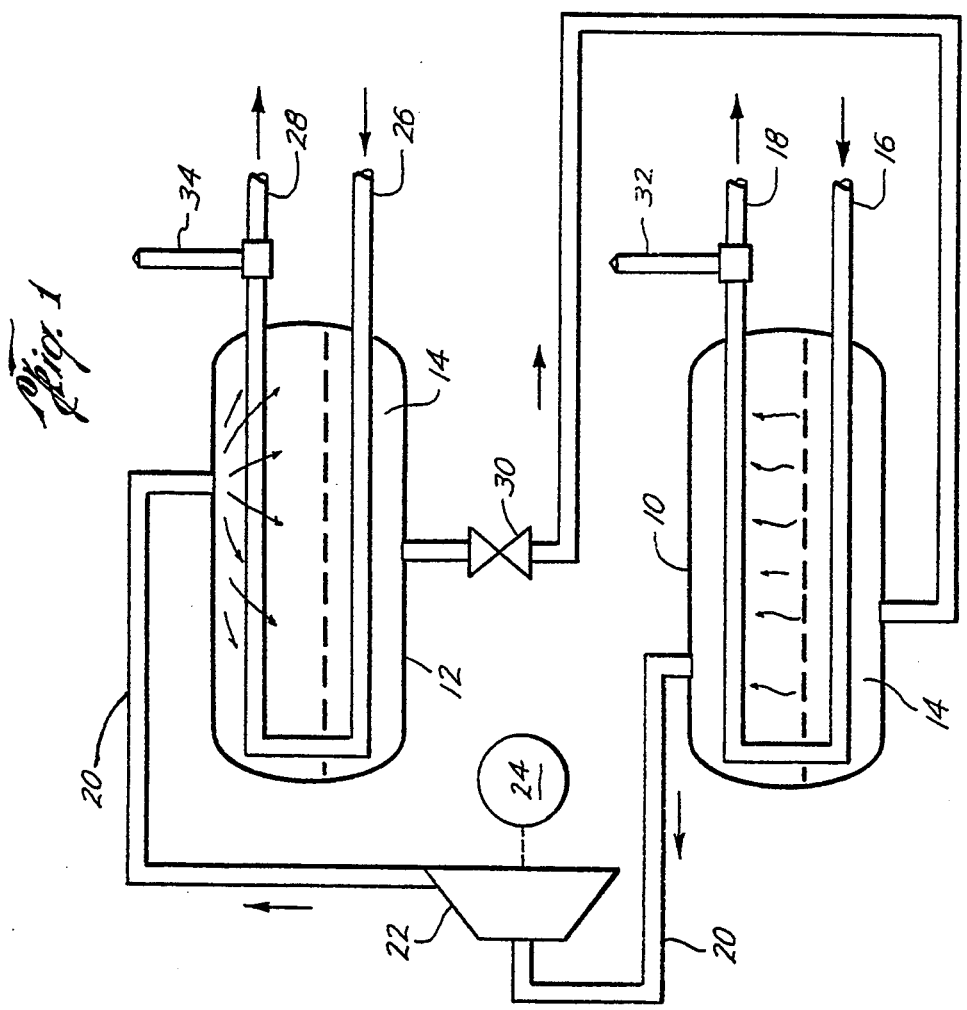

REFRIGERANT LEAK DETECTOR SYSTEM

BACKGROUND OF THE INVENTION

Chillers comprising an evaporator and a condenser have long been known. Typically, the condenser and evaporator will each comprise heat exchangers that have many smaller tubes that pass through a larger tube, or shell. Also typically, a refrigerant having a suitably low specific heat and vapor pressure, such as a fluorocarbon, sold under the trademark Freon, is passed through the shell while a heat exchanging liquid having a relatively high specific heat and vapor pressure, such as water, is passed through the smaller tubes. So passing through the heat exchanger, heat is transferred between the refrigerant and the heat exchanging liquid.

In the evaporator, heat is extracted from the heat exchanging liquid as the refrigerant is heated and, thus, gasified. The resulting cold heat exchanging liquid is routed for air conditioning, industrial cooling, and the like. The resulting gasified refrigerant is routed to a compressor where it is compressed to increase its pressure. From the compressor, the pressurized refrigerant is routed to the condenser. In the condenser, the pressurized refrigerant gas is passed through the shell of the heat exchanger having smaller tubes through which a cooling heat exchanging liquid is passed. So passing through the heat exchanger, the refrigerant is cooled and the heat exchanging liquid is heated.

At the increased pressure of the condenser and the lower temperature, the refrigerant changes phase from gas back to liquid. The liquefied refrigerant is routed back to the evaporator through a pressure valve. As the pressure is lowered, the refrigerant becomes again cold. The cold, liquid refrigerant is again used to cool the heat exchanging liquid in the evaporator, and the cycle is repeated.

One of the major problems with chillers of the above kind is that leaks develop in the heat exchangers. Such leaks typically arise from internal and external corrosion and cracking, which is caused by the high pressures, extreme temperatures, and the caustic nature of the refrigerants and heat exchanging liquids. Leaks are very undesirable, because they decrease the efficiency of the chillers and cause wasting of refrigerant. Furthermore, the refrigerant used in chillers is typically Freon, the release of which into the environment is now known to cause damage to the Earth's ozone layer. As the dangers of leaking Freon have been discovered, it has become increasingly important to monitor and to prevent such leakage.

Detecting Freon leaks in chillers is not practicable using the prior art. Such leaks are usually small, and the Freon is discreetly carried from the chiller by the heat exchanging fluid that exits the heat exchangers.

U.S. Pat. No. 4,910,463 to Williams discloses an apparatus for detecting levels of halogen gases, such as Freon, in a confined space. Upon detecting a pre-determined concentration of halogen gas, the apparatus can sound an alarm. The apparatus is not capable of continuously detecting refrigerant in the flow of a heat exchanging liquid such as water.

U.S. Pat. No. 4,862,698 to Morgan et al. discloses a method and apparatus to detect refrigerant leaks by increasing the temperature of the refrigerant, thereby increasing the refrigerant pressure and making it easier to detect refrigerant leaks. This method is not applicable to the typical chiller refrigeration system because raising the refrigerant temperature would adversely affect the performance of the chiller while it is on-line. This method would work only if the chiller system is off-line and the refrigerant temperature is stabilized. In addition, this invention does not address a method for detecting the existence of refrigerant in the heat exchange fluid.

U.S. Pat. No. 5,228,304 to Ryan discloses a method and apparatus for determining the amount of refrigerant in a closed system by monitoring the liquid refrigerant level in the system utilizing a float apparatus. This is not applicable to monitoring the refrigerant levels in chiller refrigerant systems because the liquid refrigerant levels in chiller systems fluctuate drastically depending on the heat load on the heat exchanger. This method does not address a direct method for detecting the existence of refrigerant in the heat exchange fluid.

None of the foregoing prior art teaches how to test for refrigerant in a flow of heat exchanging fluid, such as water, in a chiller.

SUMMARY OF THE INVENTION

The present invention is directed toward providing a method and apparatus to detect the existence of refrigeration leaks in the heat exchangers of refrigeration systems which utilize a fluid heat exchange medium as part of the refrigeration process to either lower the refrigeration temperature or raise the refrigeration temperature, of which chillers are a typical example. Accordingly, it is an object of this invention to provide a means whereby refrigerant leaks can be readily detected and will reliably determine that refrigerant has leaked into the heat exchange fluid.

It is another object of the present; invention to include a means by which Freon vapors can be detected either with hand held detection devices for periodical checking or continuous monitoring.

It is another object of the present invention to be able to monitor the refrigeration system for leaks in the heat exchanger while the system is either operating thereby allowing the system to perform its coming function without interruption or while the system is off-line and not operating.

It is still another object of the present invention to be able to monitor the refrigeration system without discarding any of the heat exchange fluid or preventing the fluid from leaking into the surrounding environment.

Still another objective of the present invention is to provide a means by which a refrigerant leak detection system can be readily installed on either existing refrigerant systems or new refrigerant systems without affecting the performance of the system.

It is another objective of this invention to provide a refrigerant leak detection system, which can initiate and maintain an electrical circuit to an audible and/or visual alarm during continued operation of the refrigeration system when a refrigerant leak has been detected.

It is an objective of this invention to provide a method and apparatus to control the liquid level in the sample chamber, utilizing readily available control technology and compressed air, thereby making the system perform its required function as inexpensive as is practical.

It is an objective of this invention to provide an apparatus made of readily available materials.

It is an objective of this invention to provide a method and apparatus to arrange the components of this invention to provide maximum performance of the refrigerant leak detection system.

To achieve the foregoing objects, there is disclosed an apparatus for detecting refrigerant leaks in a refrigeration system having a refrigerant and a heat exchanging fluid comprising a heat exchanger having a conduit therethrough for transporting a heat exchanging liquid, the conduit having first and second ends; a stand pipe in communication with one of the ends of the conduit; means for maintaining a gas pocket in the stand pipe; and means for detecting gasified refrigerant in a gas pocket within the stand pipe.

The means for maintaining a gas pocket in the stand pipe may further comprise means for detecting a volume of gas in the stand pipe and means for injecting gas into the stand pipe. The means for detecting a volume of gas in the stand pipe may further comprise a fluid-level detecting means. The fluid-level detecting means may further comprise a plurality of float switches. The foregoing apparatus may further comprise means for mixing a volume of air in the stand pipe. The mixing means may further comprise means for injecting air into the stand pipe below the surface of any liquid in the stand pipe.

Also to achieve the foregoing objects, there is disclosed an apparatus for detecting a halogen gas within a liquid flowing through a conduit comprising a conduit for transporting a liquid containing halogen gas; a stand pipe in communication with the conduit; means for maintaining a gas pocket in the stand pipe; and means for detecting halogen gas in a gas pocket within the stand pipe.

Also to achieve the foregoing objects, there is disclosed a method for detecting gasified refrigerant within a conduit carrying a liquid comprising the steps of exposing a liquid in a conduit to a stand pipe in communication with the conduit: establishing a gas pocket in the stand pipe; and testing the gas in the stand pipe for gasified refrigerant. The foregoing method may further comprise the additional steps of detecting the volume of the gas pocket in the stand pipe and injecting non-halogen air into the stand pipe. The foregoing method may further comprise the step of mixing the gas in the stand pipe. The mixing step may further comprise continually changing the volume of the gas pocket.

BRIEF DESCRIPTION OF THE DRAWINGS

FIG. 1 depicts a schematic of a chiller system employing the claimed invention.

FIG. 2 depicts a front view of a stand pipe according the claimed invention.

DETAILED DESCRIPTION OF THE INVENTION AND PREFERRED EMBODIMENT

Figure 3:
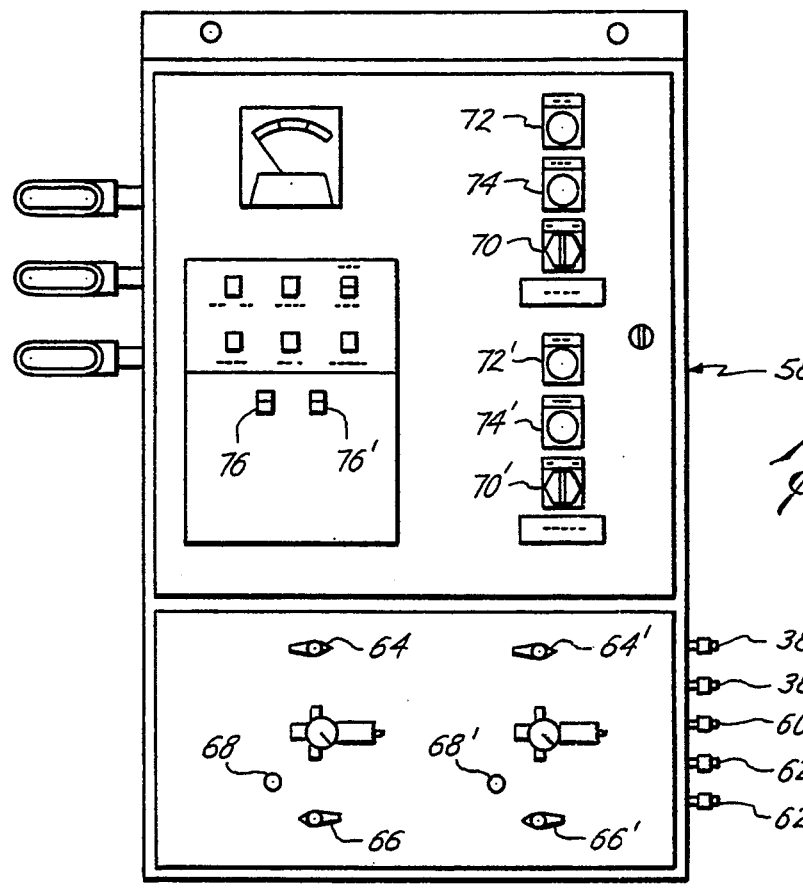
FIG. 3 depicts a front view of a control board and halogen tester employed by the claimed invention.

The present invention is particularly useful in detecting halogen gas in the flow of a liquid. For purposes of illustration, the invention will be described herein in its preferred embodiment as a Freon leak detector system for a chiller having heat exchangers within a condenser and an evaporator.

Referring now to the drawings, particularly FIG. 1, a chiller employing the present invention has an evaporator 10 and condenser 12. The evaporator 10 and condenser 112 each comprise a tube-side and shell-side heat exchanger system, the likes of which are well known to those skilled in the relevant art. The inside walls of the evaporator 10 and condenser 12 serve as the "shell side" of the heat exchanger system, through which run smaller pipes (not shown) that serve as the "tube side" of heat exchanger system.

The evaporator 10 contains Freon in its shell side. A first heat exchanging liquid 16, of warm temperature, of which pure water or glycol in an aqueous solution are preferred, is pumped through the tube side of the evaporator 10. The liquid Freon 14 cools the first heat exchanging liquid 16 and is gasified by the heat of the first heat; exchanging liquid 16, whereby the liquid Freon 14 changes phase to freon gas 20. The first heat exchanging liquid 16 emerges from the evaporator 10 as chilled heat exchanging liquid 18, which can be used for numerous useful purposes such as air condition, industrial cooling, and the like.

The gasified Freon 20 is compressed to a higher pressure by a compressor 22, driven by a motor 24, and pumped into the shell side of the condenser 12. The increase in pressure generally increases the temperature of gasified Freon 20.

A second heat exchanging liquid 26, of cool temperature, of which water is preferred, is pumped through the tube side of the condenser 12. The second heat exchanging liquid 26 cools the gasified Freon 20 is heated by the gasified Freon 20. The second heat exchanging liquid 26 emerges form the condenser 12 as heated heat exchanging liquid 28. At the elevated pressure of the condenser 12, the cooling of the gasified freon 20 by the second heat exchanging liquid 26 is sufficient to cause the gasified Freon 20 to change phase back to liquid Freon 14. The liquid Freon 14 within the condenser 12 is forced through an expansion valve 30. As the liquid Freon 14 is forced through the expansion valve 30, the liquid Freon 14 further cools and again enters the evaporator 10, where the refrigeration cycle is repeated.

The present invention provides for stand pipes 32 and 34 placed in communication with conduits carrying the exiting heat exchanging fluids 18 and 28. Each of the stand pipes comprise identical apparatus.

FIG. 2 depicts stand pipe 32, which is identical to stand pipe 34. Stand pipe 32 comprises a pipe 36 and an air injection conduit 38 having a first check valve 40. The stand pipe 32 has a standard sight level gauge 42 and liquid level float switches 44 and 46. The top of the stand pipe 32 has a dome 48, a shut-off valve 50, and a series of second and third check valves 52 and 54.

The base 55 of the stand pipe 32 is in communication with the conduit carrying the exiting heat exchanging fluid 18. The heat exchanging fluid 18 rises in the stand pipe 32 in response to the pressure of a vapor pocket 56 and the pressure of the heat exchanging fluid 18. The volume of the vapor pocket 56 is controlled by the float switches 44 and 46. If the level of the heat exchanging fluid 18 rises to the level of the float switch 46, float switch 46 activates means for pumping ambient air through ambient air injection conduit 38, which increases the pressure of the vapor pocket, 56 and causes the level of the heat exchanging fluid 18 to fall. If the level of the heat exchanging fluid drops to the level of the float switch 44, float switch 44 activates means for drawing gas from the vapor pocket 56 through the shut-off valve 50, which decreases the pressure of the vapor pocket 56 and causes the level of heat exchanging fluid 18 to rise. The sight level gauge 42 is made of clear glass or clear plastic and permits an operator to view the actual level of the heat exchanging fluid 18 without opening the stand pipe 32.

Check valves 40, 52, and 54 are for safety. Specifically, check valve 40 prevents the heat exchanging fluid 18 from flooding into the ambient air source. Check valves 52 and 54 provide in series a means for keeping the heat exchanging fluid 18 from passing through the shut-off valve 50.

FIG. 3 depicts a typical embodiment of a control board and halogen tester 58 for use with the claimed invention. Parts relating specifically to stand pipe 34 and corresponding to identical parts relating to stand pipe 32 are identified in FIG. 2 by corresponding prime numbers. The control board and halogen tester 58 has an air input conduit 60. When activated by the switch 46, air is drawn into the air input conduit 60 and injected in the stand pipe 32 through injection conduit 38. Gas from the vapor pocket 56, drawn through the shut-off valve 50, is injected into the control board and halogen tester 58 through gas input 62. The control board and halogen tester 58 has bleed switches 64 and 66 for controlling the check valves 52 and 54. The control board and halogen tester 58 also has a bleed valve 68 for bleeding from the tester 58 any unwanted gas drawn through the gas input 62. Panel switch 70 activates the float switches 44 and 46 to make them responsive to the level of heat exchanging fluid 18 in the stand pipes 32. Lights 72 and 74 indicate whether float switches 44 and 46 have been so activated. In the event that the halogen tester 58 detects a pre-determined level of Freon gas, alarm light 76 is activated.

In operation, Freon may leak within either the condenser 12 or the evaporator 10. Because the Freon is at all times under much more pressure than the heat exchanging fluid, the Freon will escape into the flow of the heat exchanging fluid where the Freon will quickly gasify. Thus, for example, Freon leaks within the heat exchanger of the evaporator 10 will cause gasified Freon to appear in the exiting flow of heat exchanging fluid 18.

Heat exchanging fluid 18 is cycled through the stand pipe 32 at a suitable pressure readily determined by those skilled in the art. Any gasified refrigerant in the heat exchanging fluid 18 will rise into the vapor pocket 56. Gasified refrigerant is much heavier than ambient air. Thus, any gasified refrigerant will tend to gather at the bottom of the vapor pocket 56. To lift the gasified refrigerant to the shut-off valve 50, it is preferred to mix and to homogenize the vapor pocket 56 with bubbles of gas injected through the injection conduit 38. In the preferred embodiment, the stand pipe 32 acts as a "lung" as the level of the heat exchanging fluid 18 is caused to rise and fall at a constant predetermined rate between the float switches 44 and 46. Each time the vapor pocket 56 expands, bubbles of ambient air from the ambient air injection conduit 38 pop on the surface of the heat exchanger fluid 18, thus continually mixing the vapor pocket 56. It is also possible without constantly changing the level of the heat exchanging fluid 18 to mix and to homogenize the vapor pocket 56 by means such as a fan within the stand pipe (not shown). It is also possible without mixing and homogenizing the vapor pocket 56 to take halogen gas samples from the bottom of the vapor pocket 56, using such means as a sample tube (not shown) extending from the shut-off valve 50 to the bottom of the vapor pocket 56.

As gas from the vapor pocket 56 is drawn through the shut-off valve 50, the gas is tested by the control board and halogen tester 58 in a manner well known to those skilled in the art.

Figure 4:
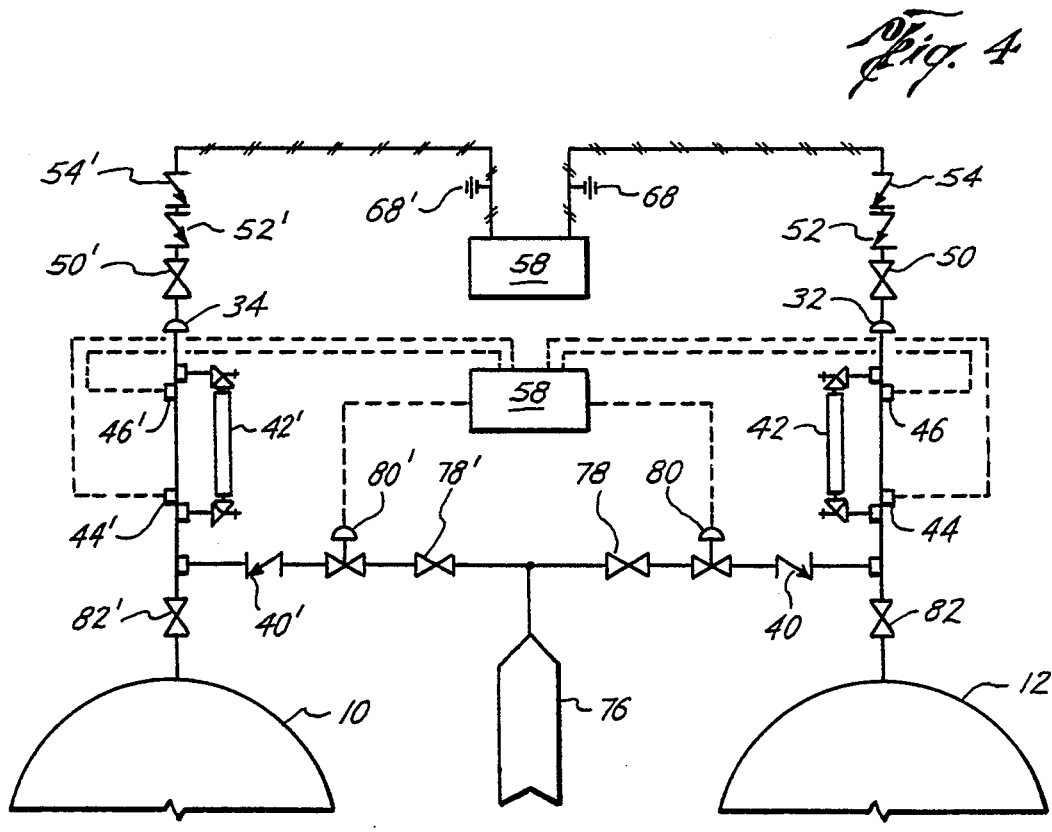
FIG. 4 depicts a flow diagram of a system in accordance with the claimed invention.

FIG. 4 depicts a flow diagram of the system described in FIGS. 2 and 3. Parts relating specifically to stand pipe 34 and corresponding to identical parts relating to stand pipe 32 are identified in FIG. 4 by corresponding prime numbers. The preferred embodiment of the claim invention contemplates a plant pressurized air source 76 at a pressure of 100 psig. The appropriate pressure of the heat exchanging fluid 18 is readily determined by those skilled in the relevant art. Air from the air source 76 passes through a manual isolation valve 78 and a first solenoid check valve 80, which is activated and deactivated by signals from the float switches 44 and 46 which are processed by the control board 58, and a first check valve 40. Heat exchanging fluid 18 leaves the condenser 12 and enters the stand pipe 32 through an isolation valve 82. Gas from the stand pipe 32 passes through the shut-off valve 50 into the control board halogen and tester 58, where the gas is detected.

It is to be understood that the foregoing description is of the preferred embodiment. Notwithstanding the preferred embodiment, the invention can be used to detect any halogen gas in the flow of a liquid, and the invention can be used with or without a chiller. "Stand pipe" is intended to encompass any chamber that affects formation of a closed vapor pocket over the surface of a liquid and from which gas samples may be taken. "Halogen" is intended to mean any gas molecule comprising a halogen atom.

I claim:

1. An apparatus for detecting refrigerant leaks in a refrigeration system having a refrigerant and a heat exchanging fluid comprising:
   a heat exchanger having a conduit therethrough for transporting a heat exchanging liquid, the conduit having first and second ends;
   a stand pipe in communication with one of the ends of the conduit;
   means for detecting a volume of gas in the stand pipe;
   means for injecting gas into the stand pipe; and
   means for detecting gasified refrigerant in a gas pocket within the stand pipe.

2. The apparatus of claim 1 in which the means for detecting a volume of gas in the stand pipe comprises a fluid-level detecting means.

3. The apparatus of claim 2 in which the fluid-level detecting means comprises a plurality of float switches.

4. The apparatus of claim 2 further comprising means mixing a volume of air in the stand pipe.

5. The apparatus of claim 4 in which the mixing means comprises means for injecting air into the stand pipe below the surface of any liquid in the stand pipe.

6. A method for detecting gasified refrigerant within a conduit carrying a liquid comprising the steps of:
   exposing a liquid in a conduit to a stand pipe in communication with the conduit;
   establishing a gas pocket in the stand pipe;
   detecting a volume of the gas pocket in the stand pipe;
   injecting non-halogen air into the stand pipe; and
   testing the gas in the stand pipe for gasified refrigerant.

7. The method of claim 6 further comprising the step of mixing the gas in the stand pipe.

8. The method of claim 7 in which the mixing step comprises continually changing the volume of the gas pocket.

* * * * *

UNITED STATES PATENT AND TRADEMARK OFFICE
CERTIFICATE OF CORRECTION

PATENT NO. : 5,351,500

DATED : October 4, 1994

INVENTOR(S) : Gordon R. Morrow

It is certified that error appears in the above-identified patent and that said Letters Patent is hereby corrected as shown below:

Col. 2, line 34, "present; invention" should be —present invention—.
line 41, "coming" should be —cooling—.

Col. 3, line 36, "conduit: establishing" should be —conduit; establishing—.

Col. 4, line 60, "pocket, 56" should be —pocket 56—.

Col. 6, line 48, after "means" the word —for— should be inserted.

Signed and Sealed this

Eleventh Day of April, 1995

Attest:

BRUCE LEHMAN

Attesting Officer

Commissioner of Patents and Trademarks